United States Patent [19]
Domel

[11] Patent Number: 6,062,290
[45] Date of Patent: May 16, 2000

[54] PHOTOCELL MOUNTING APPARATUS FOR VERTICAL BLINDS

[75] Inventor: Douglas R. Domel, Chatsworth, Calif.

[73] Assignee: Harmonic Design, Inc., Valencia, Calif.

[21] Appl. No.: 09/031,806

[22] Filed: Feb. 27, 1998

[51] Int. Cl.[7] .................................................. E06B 9/36
[52] U.S. Cl. ............................ 160/176.1 P; 160/DIG. 17
[58] Field of Search ..................... 160/168.1 P, DIG. 17, 160/176.1 P, 1, 5, 7, 84.02, 188, 189, 310, 311, 331

[56] References Cited

U.S. PATENT DOCUMENTS

| | | | |
|---|---|---|---|
| 4,773,464 | 9/1988 | Kobayashi | 160/176.1 P X |
| 4,934,438 | 6/1990 | Yuhas et al. | 160/176.1 P X |
| 4,979,552 | 12/1990 | Zanden | 160/176.1 P X |
| 5,467,808 | 11/1995 | Bell | 160/168.1 P |

*Primary Examiner*—David M. Purol
*Attorney, Agent, or Firm*—John L. Rogitz

[57] ABSTRACT

An automatic control apparatus for window coverings where the control apparatus is mounted in the space between a headrail and a window. The control apparatus is mounted to the rear surface of the headrail so as to overlie the rear surface of the headrail and is blocked from view by the headrail. A battery pack may be mounted to the control apparatus along the rear surface of the headrail and would also be blocked from view by the headrail.

10 Claims, 5 Drawing Sheets

PHOTOCELL MOUNTING APPARATUS FOR VERTICAL BLINDS

FIELD OF THE INVENTION

The present invention relates to adjustable window coverings such as blinds having a window covering which can be moved to vary the amount of light that is allowed past the window covering. More particularly, the invention relates to a motor powered controller for varying the position of the window covering.

BACKGROUND OF THE INVENTION

Adjustable window coverings are commonly used in both residential and business buildings. Window covering units typically include a headrail which supports the window covering. The headrail extends across the top of the window covering and is typically mounted to a wall over a window. Examples of window coverings that incorporate headrails are vertical blinds, horizontal blinds and pleated shades.

Various devices exist for automatically controlling the operation of window coverings. The placement of motors and power supplies for automatic window covering controls is an important aspect of the controlled devices. Large battery packs and motors located outside of the headrail are visible and unaesthetic. Besides controlling the amount of light that is allowed to enter into a room, window coverings are used to accent or accompany the designing scheme of rooms. Control devices that are plainly visible can detract from the appearance of the window coverings. Thus, it is desirable to hide the automatic control apparatus from view.

Considerable progress has been made in designing aesthetic control apparatus by placing motor driven actuators in the headrails of the window covering units. For example, a family of patents issued to Domel et al. (U.S. Pat. Nos. 5,495,153, 5,517,094 and 5,714,855 which are hereby incorporated by reference herein) teach mounting an actuator for window coverings in the headrails of the window coverings. The headrail mounted actuators listed above meet the aesthetic need for concealing a window covering control apparatus. However, further improvement to conceal motor driven actuators as well as power supplies is desirable.

In some types of window covering units, the headrail is spaced away from the window. In particular, the headrail in a vertical blind unit is spaced away from a window, because when the angle of the vertical blind is rotated, the individual louvers of the blind pass through a region of space behind the headrail. Thus, vertical blind headrails are spaced far enough from a window to allow for vertical tilt. This space between the window and the headrail has heretofore gone unused and is blocked from view from the interior of a room by the headrail itself.

SUMMARY OF THE INVENTION

One aspect of the present invention provides a control apparatus for controlling movement of a window covering between open and closed positions. The control apparatus is mounted to the headrail of a vertical window blind unit in the heretofore unused space between the headrail of the vertical window blind unit and a window. The control apparatus includes a main section of housing which is adapted for mounting to the headrail so that the main section overlies the rear surface of the headrail. The headrail thus conceals the main section of the housing from view.

In accordance with the present invention, a motor is mounted in the main section, with a drive train connected to the motor. Also disposed in the main section is an actuator assembly for selectively operating the motor. As these components are mounted in the main section of the housing, they are also hidden from view by the headrail. Concealing these components improves the aesthetics of the vertical window blind unit.

The preferred assemblies according to the present invention also includes a control section of the housing transverse to the axis of elongation of the main section. The control section engages one end of the headrail. The control section has a narrow width so as to minimize the amount of the control apparatus that is visible from the interior of a room. This serves to improve the aesthetic appearance of the window covering unit.

Another aspect of the present invention provides a battery pack which is connected to the main section along the axis of elongation of the main section. The battery pack can be slideably engaged with the main section or fixably mounted to the main section. When in engagement with the main section, the battery pack also overlies the rear surface of a headrail when the control apparatus is mounted to a headrail. Thus, the battery pack is also hidden from view by the headrail.

DETAILED DESCRIPTION

Figure 1:
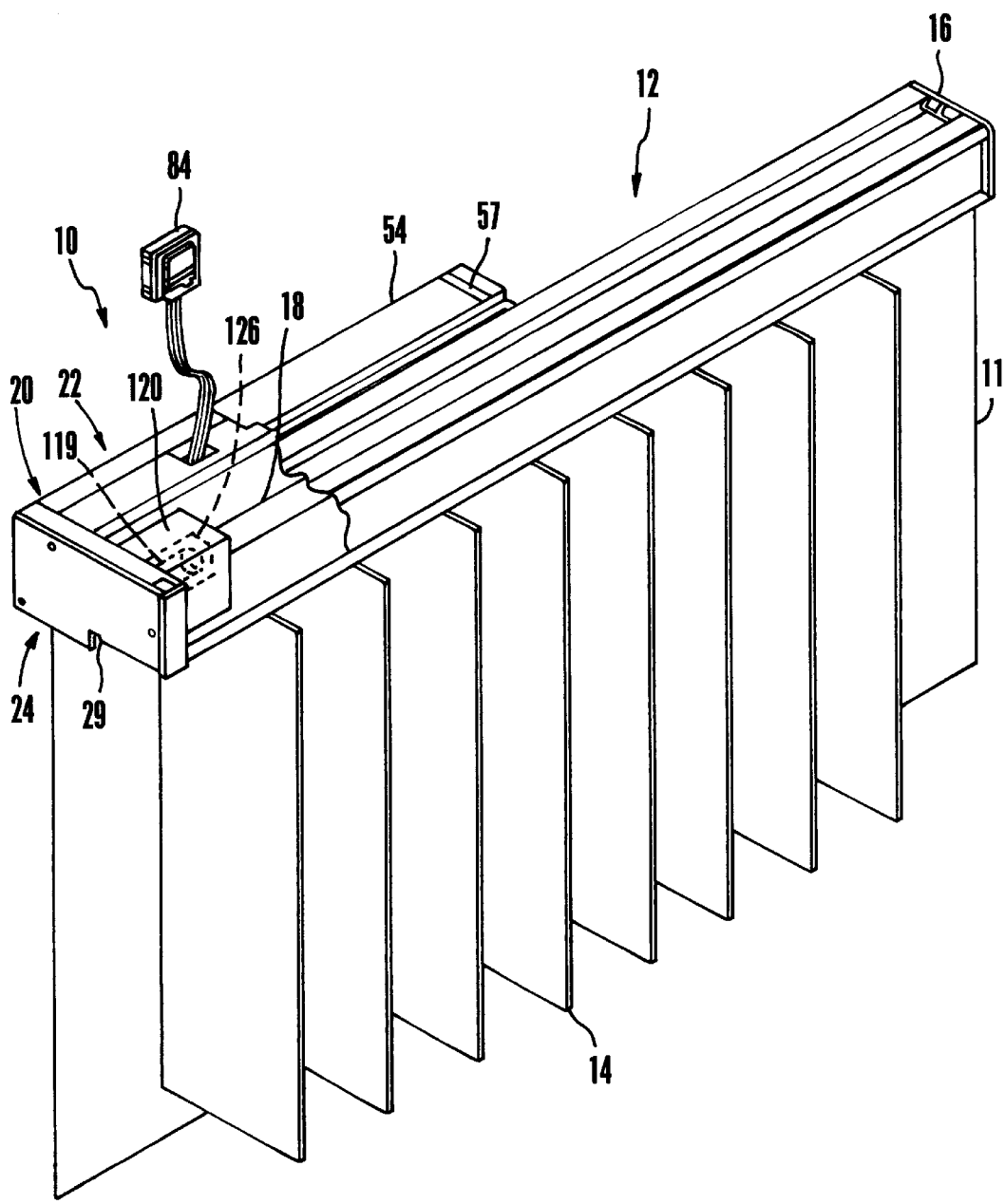
FIG. 1 is a perspective view in accordance with one embodiment of the present invention showing a control apparatus engaged with a vertical window blind unit, partly broken away to show the engagement of the control apparatus and the vertical window blind unit therein.
Figure 2:
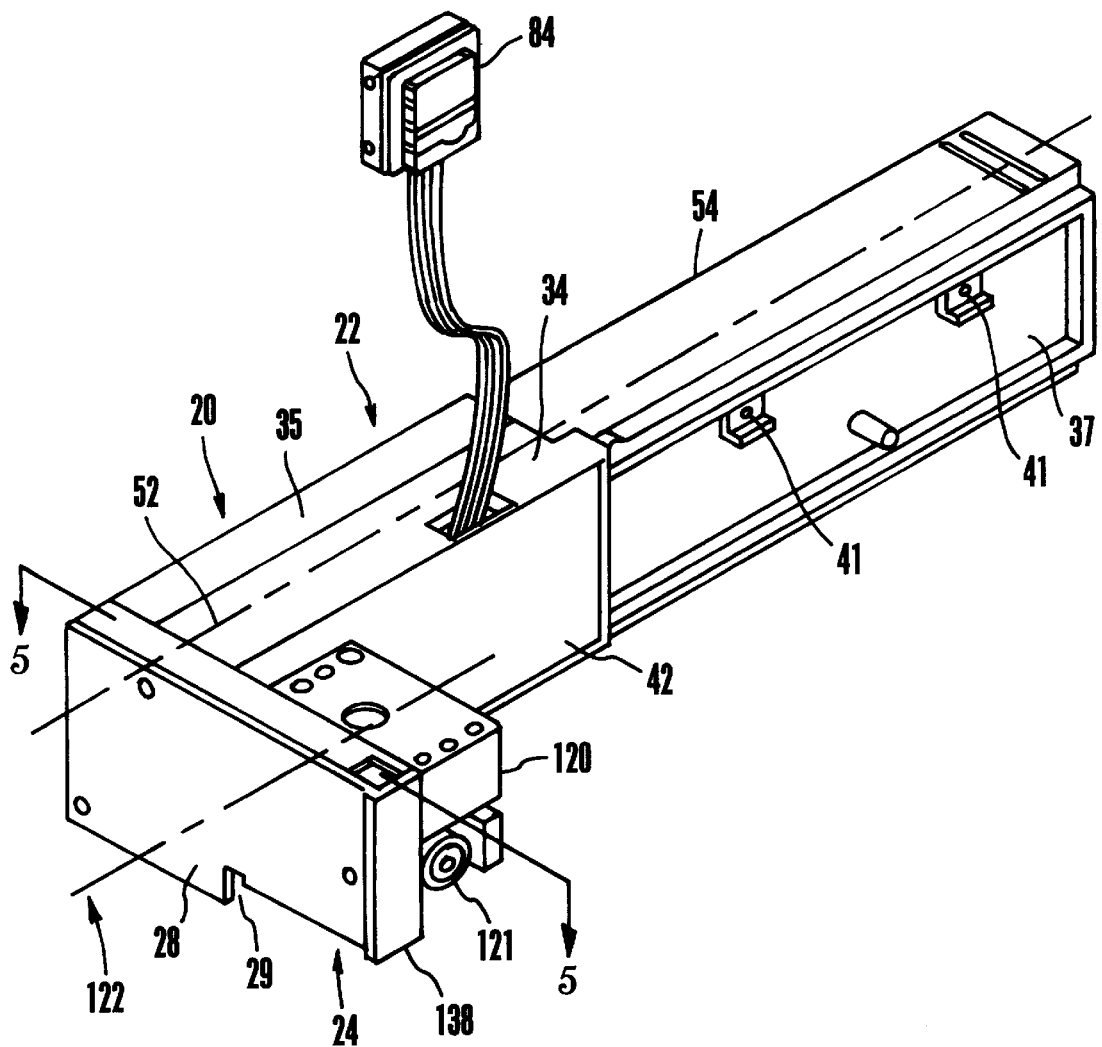
FIG. 2 is an elevated front view of the control apparatus of FIG. 1.

FIGS. 1 and 2 show the general layout of a controller apparatus in accordance with one embodiment of the present invention. The control apparatus 10, is used in conjunction with a vertical window blind unit 12 to control movements of the vertical louvers 14. In particular, the control apparatus 10 controls the vertical tilt of the vertical louvers 14. As shown in FIG. 1, the control apparatus 10 engages a headrail 16 of a vertical blind unit 12. The control apparatus 10 works in cooperation with the window control rod 18 which is disposed inside the headrail 16.

Figure 3:
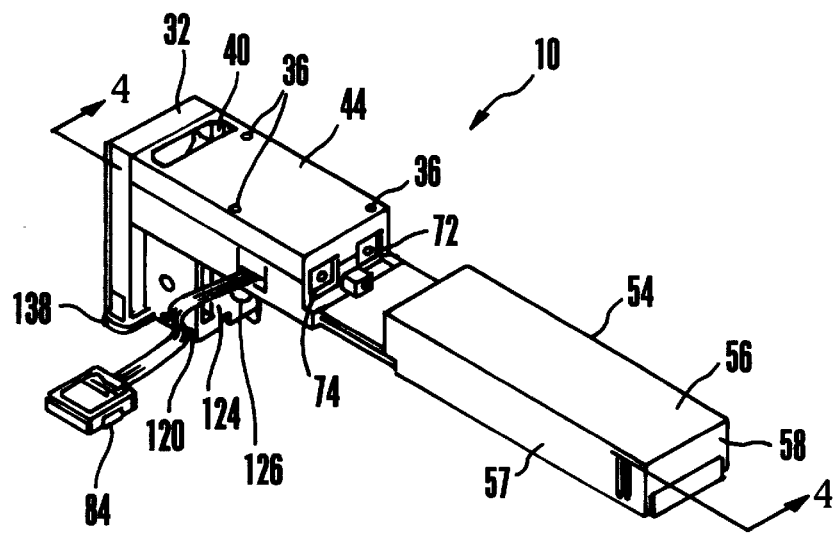
FIG. 3 is an elevated top view of the control apparatus of FIG. 1.

The control apparatus 10 includes a housing 20, also seen in FIG. 3 formed from molded ABS plastics. The housing 20 of the control apparatus 10 is comprised two sections, a main section 22 and a control section 24. The housing 20 has a generally L-shaped configuration. Control section 24 defines an inner face 26, an outer face 28, a front face 30 and a rear face 32. The main section 22 of the housing 20 is composed of two generally rectangular shaped units, front plate 34 and rear plate 35, which are connected to one another by a plurality of screws 36. Rear plate 35 includes an opening 40. Main section 22 defines a front face 42, a rear face 44, and two side faces 46 and 48. Main section 22 is designed to overlie the rear surface of a headrail 16 so as to be hidden from view by the headrail 16. Main section 22 is sized and shaped to contain an actuator assembly 50. The main section 22 has an axis of elongation 52. Control section 24 is generally flat, extending in a plane generally transverse to the axis of elongation 52 of the main section 22.

Figure 6:
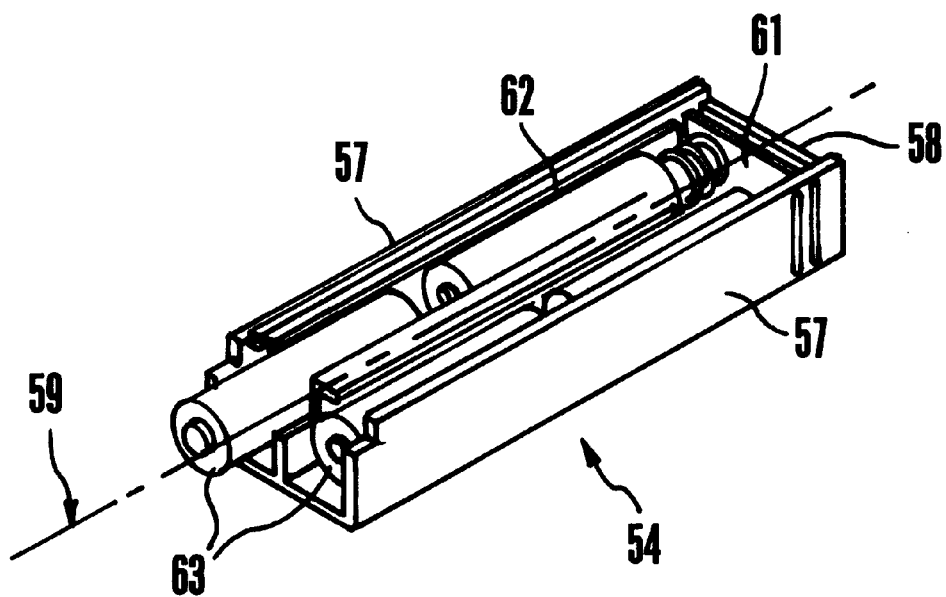
FIG. 6 is a perspective view of the battery pack of FIG. 2.
Figure 7:
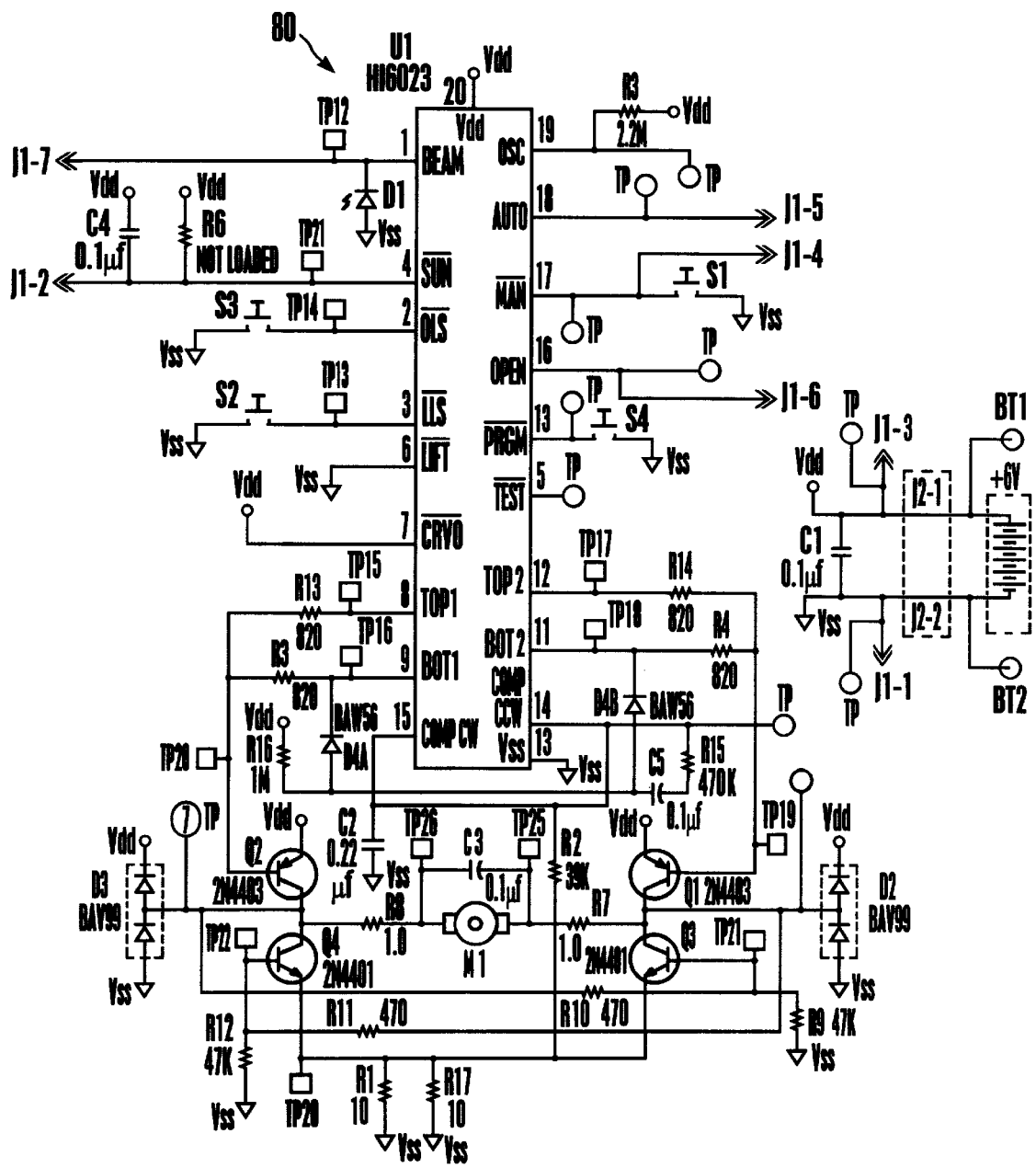
FIG. 7 is a schematic diagram of the electrical circuit of the control apparatus of FIG. 4.

The actuator assembly 50 includes a circuit board 60, which is disposed in the main section 22 of the housing 20. Side face 48 of main section 22 contains two rectangular openings along the front face 42 which are sized so that projections of the circuit board 64 and 66 can pass through the side face 48. Disposed on the first projection 64 of the circuit board 60 is a button 68. Mounted to the second projection 66 is an infrared sensor 70. Also mounted to the circuit board 60 are a pair of contacts 72 and 74 which rest against the exterior of side face 46 of the main section 22. Mounted to the circuit board 60 between the contacts 72 and 74 is a power port 76 in the form of a dual pin connector. The electrical circuit 80 incorporated in the circuit board 60 is shown in FIG. 6. This circuit is generally as taught in the aforementioned Domel et al. patents. Circuit 80 is shown for illustrative purposes only and the present invention is not limited in use to the particular circuit. Any conventional circuit can be used to actuate the control apparatus 10. The circuit 80 includes the aforementioned button 68, infrared sensor 70, contacts 72 and 74 and power port 76. Also mounted to the circuit 80 are two miniature switches, 86 and 88. The circuit 80 also includes an accessory port 82.

The accessory port 82 is used to plug in accessory items to the control apparatus 10. In the preferred embodiment, a multifunctioned tethered accessory port 84 is plugged into the accessory port 82. Optionally, a sunlight sensor (not shown) is plugged into the multifunctioned tethered accessory port 84. The sunlight sensor activates the control apparatus 10 upon receiving a sufficient quantity of light and again activates the control apparatus 10 once the level of light received drops below a certain level.

According to a further option, a movable receiver (not shown) is plugged into the multifunctioned tethered accessory port 84. If the infrared sensor 70 is blocked from view by an object, such as a decorative valence, the movable receiver can be plugged into the multifunctioned tethered accessory port 84 and tethered to an inconspicuous spot where unobstructed infrared light sensing is available.

Figure 4:
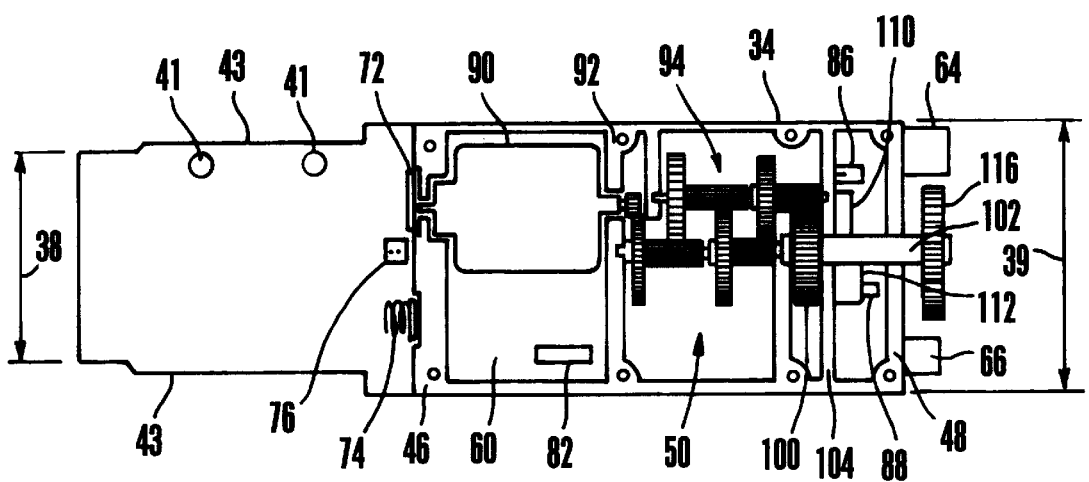
FIG. 4 is a cross sectional view of the control apparatus along line 4—4 of FIG. 3.

A DC motor 90 is mounted to the circuit board 60 in the main section 22. As shown in FIG. 4, the DC motor 90 is held in place by side face 46 of the main section 22 and rib 92. A drive train 94 including multiple stages of gear reduction is connected to the output shaft of the motor 90. Each gear of the drive train 94 includes a large radius portion and a small radius portion formed integrally therewith and is supported by an axle. Gear 100 includes an elongated cylindrical portion 102 which is rotatably mounted in rib 104 and the side face 48 of the main section 22. A pair of limiting elements 110 and 112 are mounted on the elongated cylindrical portion 102. Limiting element 110 engages miniature switch 86 when limiting element 110 is rotated to one extreme position, and limiting element 112 engages miniature switch 88 when limiting element 112 is rotated to another extreme position. The limiting elements 110 and 112 can be manually adjusted through opening 40 in the rear face 44 of the main section 22. Connected to the elongated cylindrical portion 102 beyond side face 48 of main section 22 is gear 116.

The control section 24 is connected to the main section 22 by a plurality of screws 23 passing from the inner face 26 of the control section into the side face 48 of the main section 22. Integral with the inner face 26 is a housing extension 120, sized and shaped to engage the headrail 16. The housing extension 120 extends from inner face 26 of the control section 24 and has an axis of elongation 122 generally parallel to the axis of elongation 52 of main section 22. The housing extension 120 defines an engagement face 124 which is generally transverse to the axis of elongation 122 of the housing extension 120. Mounted to each side of the housing extension 120 is a roller 121 for receiving a cord of the blind unit. A circular bore 126, parallel to the axis of elongation 122 of the housing extension 120, runs through the inner face 26 of the control section 24 and the housing extension 120. A clamping bracket 130 containing a plurality of holes is attached to the bottom of the housing extension 120. The clamping bracket 130 is attached to the housing extension 120 by fastening means, such as a screw, through one of the holes in the bracket 130.

Figure 5:
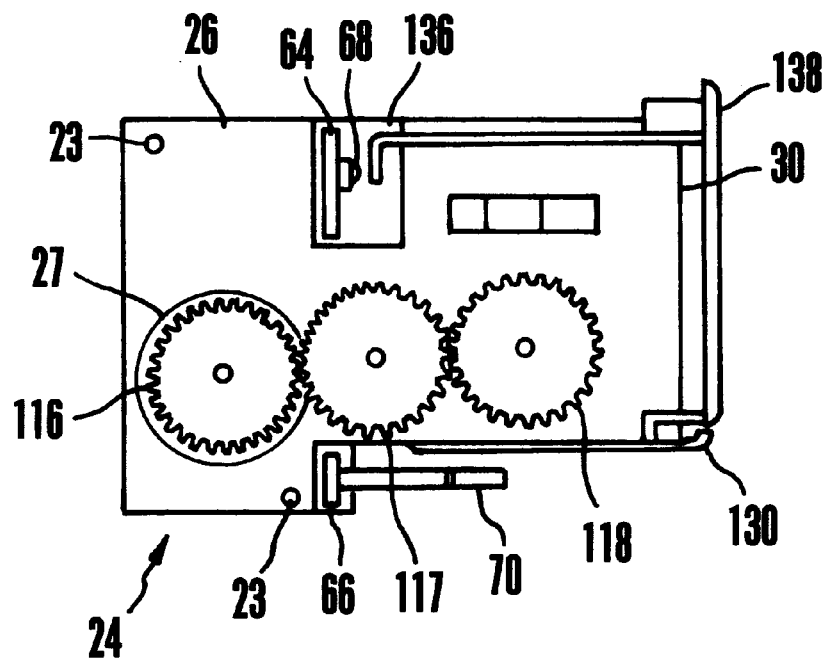
FIG. 5 is a cross sectional view of the control apparatus along line 5—5 of FIG. 2.

As shown by FIG. 5, the inner face 26 of the control section 24 contains a rectangular opening 136 sized to receive projection 64 of the circuit board 60 which carries the button 68. Disposed in the front face 30 of the control section 24 is a manual push button 138, which abuts the button 68 mounted to the circuit board 60. The manual push button 138 can be used for manual activation of the control apparatus 10. The bottom of control section 24 is stepped, so that the back portion of control section 24 is wider than the front portion. The projection 66 of the circuit board 60 that carries infrared sensor 20 rests in the front portion of the stepped region 29 of the control section 24 and extends beneath the bottom of control section 24. A circular bore 27 is also formed in the inner face 26 of the control section 24 to receive gear 116 of the drive train 94 so that gear 116 rests inside the control section 24.

As noted above, gear 116 is connected to the elongated cylindrical portion 102 of gear 100 and is housed in the control section 24. The drive train 94 continues into the control section 24, and includes a gear 117 mounted for rotation in the control section meshing with gear 116, and a gear 118 disposed in cylindrical bore 126 in the inner face 26. Gear 118 includes a hollow, elongated cylindrical body 119 which projects into the housing extension 120 and receives one end of the window control rod 18 when the control apparatus 10 is mounted to a headrail 16.

The front plate 34 of the main section 22 includes a battery pack extension 37, which is generally an elongated rectangular plate. Extension 37 has a width 38 less than width 39 of the front plate 34. Extension 37 includes a pair of circular bores 41 sized to receive a pair of screws to attach the extension 37 to the rear surface of the headrail 16. The inner face of extension 37 has a greater width than the outer face of the battery pack extension, forming narrow ribs 43 on the top and bottom edges of the inner face of extension 37. This configuration enables the battery pack extension 37 to slideably engage a battery pack 54.

The battery pack 54, as with the housing 20, is formed of ABS molded plastic, and defines a front face 56, a pair of side faces 57, and a rear face 58. The battery pack 54, as shown in FIG. 6, also has an axis of elongation 59. The battery pack 54 is configured to contain a plurality of batteries to provide power for the control apparatus 10. The battery pack 54 includes a pair of contacts 61 along the inner surface of the rear face 58 electrically connected to one another. Along the inner surface of each side face 57 of the battery pack 54 is a groove 62, the groove 62 being of a length and depth corresponding to the ribs 43 on the inner face of the battery pack extension 37. When the battery pack 54 is used in conjunction with the control apparatus 10, the grooves 62 of the battery pack 54 are aligned with the ribs 43 of the battery pack extension 37 for slideable engagement. Once the battery pack 54 is engaged with the battery pack extension 37, the axis of elongation 59 of the battery pack 54 is parallel to the axis of elongation 52 of the main section 22. Batteries 63 contained in the battery pack connect to the circuit 80 via the contacts 72 and 74.

In use, the control apparatus 10 is mounted to the headrail 16 of a vertical window blind unit 12. The housing extension 120 of the control apparatus 10 is inserted into the headrail 16 and can be mounted in place via the clamping bracket 130. The hollow, elongated cylindrical body 119 of gear 118 internally engages the window control rod 18 upon insertion into the headrail 16. Upon insertion of the housing extension 120 into the headrail 16, the main section 22 overlies the rear surface of the headrail 16 and is then mounted to the headrail 16 via screws through circular bores 41. The battery pack 54 is then slideably engaged with battery pack extension 37. Once the battery pack 54 is engaged with extension 37, the battery pack 54 also overlies the rear surface of the headrail 16. When the vertical window blind unit 12 is mounted over a window 11, the main section 22 and battery pack 54 are hidden from view from the interior of the room by the headrail 16. Thus, the only portion of the control apparatus 10 that can be seen from the interior of the room is the front face 30 of the control section 24, which presents the manual push button 138 and the infrared sensor 70. As noted above, the infrared sensor 70 is mounted on a projection 66 of the circuit board 60 that extends through the main section 22 and rests under the front portion of the bottom of the control section 24. Thus, the infrared sensor 70 is accessible to receive signals from remote control devices inside the room. The front face 30 of the control section 24 is narrow, so as to minimize the amount of the control apparatus 10 that is visible from the interior of the room. Preferably, the width of the front face 30 is less than 1 inch and more preferably between 1/8 inch and 1/2 inch.

The control apparatus 10 can be activated remotely by transmitting a signal via a remote control device which is received by the infrared sensor 70. When the infrared sensor 70 receives a signal, circuit 60 activates the motor 90, which drives the drive train 94 and causes rotation of the window control rod 18. Rotation of the window control rod 18 continues until one of the limiting elements 110 or 112 contacts its respective miniature switch, 86 or 88. Alternatively, the control apparatus 10 can be activated by depressing the manual push button 138. When manual push button 138 is depressed, the force of the depression is transmitted by the manual push button 138 to the button 68 mounted on the circuit board projection 64 located inside the control section 24. When button 68 is depressed, circuit 60 activates the motor 90, which drives the drive train 94 and causes rotation of the window control rod 18.

In a further embodiment, the battery pack 54 can be replaced with a power pack to draw power from a wall outlet. The power pack plugs into power port 76 of the actuator assembly 50 and is tethered to a wall outlet via a wire.

What is claimed is:

1. A control apparatus for a window blind unit having a headrail with a front surface and a rear surface and a blind operator disposed in the headrail, said control apparatus adapted to be mounted with the window blind unit over a window, said control apparatus comprising:

a housing having a main section adapted for mounting to the headrail so that the main section overlies the rear surface of the headrail and will be hidden from view by the headrail when the window blind unit is mounted over a window, said main section having an axis of elongation;

a motor mounted in said main section;

a drive train operatively connected to said motor in said main section, said drive train in engagement with the blind operator when the housing is mounted to the headrail;

an actuator assembly operatively connected to said motor in said main section for selectively operating said motor; and a battery pack connected to said main section so that said battery pack will overlie the rear surface of the headrail when said housing is mounted to the headrail.

2. A control apparatus as claimed in claim 1 wherein said housing further comprises a control section which projects transverse to said axis of elongation of said main section at one end of the headrail, said control section having a housing extension thereon sized and shaped to engage one end of the headrail, said control section having a width in the direction of said axis of elongation of said main section no greater than one inch.

3. A control apparatus as claimed in claim 2 wherein said battery pack has an axis of elongation, said battery pack being slideably engageable with said main section so that said axis of elongation of said main section is parallel to said axis of elongation of said battery pack.

4. A control apparatus as claimed in claim 2 wherein said battery pack has an axis of elongation, said battery pack being fixedly mounted to said main section so that said axis of elongation of said main section is parallel to said axis of elongation of said battery pack.

5. A window blind having:

a headrail with a front surface and a rear surface;

a window covering operatively connected to said headrail;

a blind operator disposed in said headrail and operatively connected to said window covering, said window blind being mounted in front of a window with said headrail being spaced from the window and with the rear surface of the headrail facing towards the window; and a control apparatus including:

a housing having a main section overlying the rear surface of the headrail so that the main section is disposed between the headrail and the window, said main section having an axis of elongation;

a motor mounted in said main section;

a drive train operatively connected to said motor in said main section, said drive train being in engagement with the blind operator;

an actuator assembly operatively connected to said motor in said main section for selectively operating said motor; and a battery pack connected to said main section, overlying said rear surface of said headrail.

6. A window blind as claimed in claim 5 wherein said window covering is movable between at least a first position and a second position so that said window covering projects rearwardly behind said headrail in at least one position of said window covering.

7. A window blind as claimed in claim 6 wherein said window covering comprises a plurality of vertical louvers.

8. A control apparatus as claimed in claim 7 wherein said housing further comprises a control section which projects transverse to said axis of elongation of said main section at one end of said headrail, said control section having a housing extension sized and shaped to engage one end of said headrail, said control section having a width in the direction of said axis of elongation of said main section no greater than one inch.

9. A control apparatus as claimed in claim 8 wherein said battery pack has an axis of elongation, said battery pack being slideably engageable with said main section so that said axis of elongation of said main section is parallel to said axis of elongation of said battery pack.

10. A control apparatus as claimed in claim 8 wherein said battery pack has an axis of elongation, said battery pack being fixedly mounted to said main section so that said axis of elongation of said main section is parallel to said axis of elongation of said battery pack.

\* \* \* \* \*